United States Patent [19]
Lobert

[11] Patent Number: 6,100,316
[45] Date of Patent: *Aug. 8, 2000

[54] RADIATION-CURABLE COATING MATERIALS AND THEIR USE FOR THE PRODUCTION OF MATT COATING FILMS

[75] Inventor: Martin Lobert, Osnabrück, Germany

[73] Assignee: BASF Coatings AG, Muenster-Hiltrup, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/765,919

[22] PCT Filed: Jul. 4, 1995

[86] PCT No.: PCT/EP95/02583

§ 371 Date: Jan. 6, 1997

§ 102(e) Date: Jan. 6, 1997

[87] PCT Pub. No.: WO96/01858

PCT Pub. Date: Jan. 25, 1996

[30] Foreign Application Priority Data

Jul. 8, 1994 [DE] Germany ................. 44 24 101

[51] Int. Cl.[7] .................................................. C08L 67/00
[52] U.S. Cl. .................... 523/500; 522/104; 522/107; 522/141; 525/303; 526/313
[58] Field of Search ........................... 522/104, 107, 522/141; 523/500, 522, 523, 526; 525/303; 526/313

[56] References Cited

U.S. PATENT DOCUMENTS

| | | | |
|---|---|---|---|
| 4,139,519 | 2/1979 | Itoh | 524/530 |
| 4,192,685 | 3/1980 | Horike | 522/107 |
| 4,518,756 | 5/1985 | Yoshida | 526/313 |
| 5,180,792 | 1/1993 | Takada | 525/423 |
| 5,290,602 | 3/1994 | Argyropoulos | 524/401 |
| 5,292,841 | 3/1994 | Smeal | 526/313 |
| 5,476,749 | 12/1995 | Steinmann | 522/92 |
| 5,573,889 | 11/1996 | Hofmann | 522/2 |
| 5,589,230 | 12/1996 | Yamamura | 522/8 |

FOREIGN PATENT DOCUMENTS

| | | |
|---|---|---|
| 0 311 288 | 4/1989 | European Pat. Off. . |
| WO 90/05061 | 5/1990 | WIPO . |

*Primary Examiner*—Paul R. Michl

[57] ABSTRACT

The invention relates to radiation-curable coating materials which comprise

A a synthetic resin containing from 1.5 to 5 mol/kg, preferably from 3.6 to 4.5 mol/kg, of ethylenically unsaturated double bonds of which not more than 10% are vinyl groups, or a mixture of such synthetic resins, and B a compound of the general formula Ar—O—$R_1$—O—CO—$CR_2$=$CH_2$, where Ar is an optionally substituted aryl radical, $R_1$ is an alkylene radical having 1 to 6 carbon atoms and $R_2$ is a hydrogen atom or an alkyl radical having 1 to 3 carbon atoms, or a mixture of such compounds, from 10 to 70% by weight of the total quantity of A and B comprising component A and from 30 to 90% by weight of the total quantity of A and B comprising component B.

6 Claims, No Drawings

6,100,316

RADIATION-CURABLE COATING MATERIALS AND THEIR USE FOR THE PRODUCTION OF MATT COATING FILMS

FIELD OF THE INVENTION

The invention relates to radiation-curable coating materials and to the use of these radiation-curable coating materials for the production of matt coating films.

BACKGROUND AND SUMMARY OF THE INVENTION

Radiation-curable coating materials are known. They are coating compositions which are cured using high-energy radiation, especially using UV radiation or using electron beams. With the known radiation-curable coating materials it is possible without problems to prepare coating films which are highly glossy to silkily glossy (degree of gloss of between 100 and 50 units according to DIN 67 530 at a measurement angle of 60°).

In contrast, the production of matt coating films gives rise to great difficulties. There exists a series of proposals for solving this technical problem. According to DE-A-29 47 597, coating materials are employed which contain a combination of radiation-curable and heat-curable binders. Disadvantages when using such coating materials are that a baking step is necessary and, when highly reactive heat-curable components are employed, the coating materials must be stored as multicomponent systems. DE-A-22 44 327 describes a technically very complex process for the production of matt coating films, in which the radiation-curable coating material is cured in a first step in an atmosphere which contains at least 5000 ppm of oxygen and subsequently in a second step in an atmosphere which contains less than 1000 ppm of oxygen, by irradiation with high-energy radiation. According to DE-A-41 18 731, matt coating films are prepared by recoating an already coated area with a radiation-curable coating material which contains matting agents, the radiation-curable coating material being applied in a coat thickness such that the cured coating film has a thickness which is less than the average particle size of the matting agent. This process too is associated with high technical effort, since it requires the application of an additional coat, and requires the thickness of the additionally applied coat to be accurately controlled.

The object of the present invention was to provide radiation-curable coating materials with which it is possible, without great technical effort, to prepare matt coating films.

It has been possible, surprisingly, to achieve this object by the provision of radiation-curable coating materials which are characterized in that they contain A a synthetic resin containing from 1.5 to 5 mol/kg, preferably from 3.6 to 4.5 mol/kg, of ethylenically unsaturated double bonds of which not more than 10%, preferably not more than 5%, are vinyl groups, or a mixture of such synthetic resins, and B a compound of the general formula Ar—O—$R_1$—O—CO—$CR_2$=$CH_2$, where Ar is an optionally substituted aryl radical, preferably a phenyl radical, $R_1$ is an alkylene radical having 1 to 6 carbon atoms, preferably an alkylene radical having 1 to 3 carbon atoms, very preferably a —$CH_2$—$CH_2$— radical, and $R_2$ is a hydrogen atom or an alkyl radical having 1 to 3 carbon atoms, preferably a hydrogen atom or a methyl radical, or a mixture of such compounds, from 10 to 70%, preferably from 20 to 60%, by weight of the total quantity of A and B comprising component A and from 30 to 90%, preferably from 40 to 80%, by weight of the total quantity of A and B comprising component B.

Using the radiation-curable coating materials provided in accordance with the invention it is possible, surprisingly and using the application devices and application methods customary for radiation-curable coating materials, to produce matt coating films, especially coating films having a degree of gloss of between 3 and 50 units according to DIN 67 530 (measured at a measurement angle of 60°).

DETAILED DESCRIPTION

The synthetic resins employed as component A in the coating materials according to the invention are generally known and commercially available. Component A may, for example, be a polyester resin, a polyacrylate resin or a polyurethane resin, or a mixture of such resins. Component A preferably comprises a polyester resin.

Polyester resins which can be employed as component A may be prepared in a conventional manner from polyols and polycarboxylic acids, with the optional use of monools and/or monocarboxylic acids. The introduction of ethylenically unsaturated double bonds into the polyester resins can be effected by using polyols containing ethylenically unsaturated double bonds and/or polycarboxylic acids containing ethylenically unsaturated double bonds and/or monools containing ethylenically unsaturated double bonds and/or monocarboxylic acids containing ethylenically unsaturated double bonds. As component A it is very particularly preferred to employ polyester resins which have been prepared from fumaric or maleic acid, tetrahydrophthalic acid and diethylene glycol.

As component B, the radiation-curable coating materials according to the invention very particularly preferably contain phenoxyethyl acrylate.

In addition to components A and B, the coating materials according to the invention may also contain from 0.01 to 66%, preferably from 10 to 40%, by weight, based on A+B=100% by weight, of C matting agents and/or fillers. As component C the coating materials according to the invention may contain all matting agents and/or fillers which can be employed in radiation-curable coating materials. Examples which are mentioned are silicic acid, barium sulfate, talc, polyolefin waxes, polyamide waxes and kaolin. As component C it is preferred to employ highly disperse silicic acid.

The coating materials according to the invention may also contain from 0.01 to 33%, preferably 5 to 25%, by weight based on A+B=100% by weight, of D pigments. As component D, the coating materials according to the invention may contain all pigments which can be employed in radiation-curable coating materials.

In addition to components A, B, C and D the coating materials according to the invention may also contain further binders, other than component A, which are suitable for radiation-curable coating materials, for example vinyl group-containing polyacrylates or polymethacrylates, polyester acrylates, polyether acrylates or epoxy acrylates, and low molecular weight aliphatic or cycloaliphatic esters of acrylic or methacrylic acid, and other additives which are customary for radiation-curable coating materials, for example photoinitiators, adhesion promoters, deaerating agents, wetting auxiliaries, anti-settling agents, and leveling auxiliaries.

The coating materials according to the invention can be cured with the aid of high-energy radiation. They are preferably cured with the aid of UV radiation or with the aid of electron beams. If curing is to be effected by means of UV radiation, at least one photoinitiator suitable for UV-curable coating materials is advantageously added to the coating materials.

The radiation-curable coating materials according to the invention can be applied with the aid of all application methods which are suitable for radiation-curable coating materials to any desired substrates, for example metal, glass, wood, wood materials, for example fiberboard or MDF (medium density fiber) boards, plastic and paper, and then cured by means of high-energy radiation. In this way it is possible, surprisingly, to produce matt coating films with low degrees of gloss (down to 3 units according to DIN 67 530 at a 60° measurement angle). The coating films produced with the coating materials according to the invention are distinguished by high mechanical and chemical resistance.

The invention is illustrated in more detail in the embodiment examples. All indications of parts and percentages are to be understood as indications by weight, unless expressly stated otherwise.

2.0 parts of a mixture comprising 23.1 parts of an unsaturated polyester resin (constituents: 24.9% by weight fumaric acid, 6.2% by weight maleic acid, 44.5% by weight diethylene glycol and 24.3% by weight tetrahydrophthalic acid) and 18.9 parts of dipropylene glycol diacrylate 0.3 parts of a commercial dispersion auxiliary, 7.0 parts of highly disperse silicic acid, 21.0 parts of talc, 14.0 parts of rutile pigment (RHD-2, manufacturer: Tioxide), and 3.5 parts of phenoxyethyl acrylate are weighed into a mixer and dispersed for 20 minutes at 3000 rpm with a dissolver. Subsequently, 12.2 parts of phenoxyethyl acrylate are used to establish a viscosity of 45 s according to DIN 53211-4 at a temperature of 20 degrees Celsius.

The coating material described above is applied (75 g/m²) to a primed and sanded (cross-sander with 220 grain) fiberboard using a curtain coating machine, and is cured with electron beams (acceleration voltage 180 kV; dose 120 kGy). The degree of gloss of the coat thus obtained is 3 units (according to DIN 67530, measurement angle 60°).

What is claimed is:

1. A process for the production of a matt coating film having a gloss of between 3 and 50 units according to DIN 67 530, comprising applying a radiation-curable coating material to a substrate, the coating material comprising
A. a synthetic resin containing from 3.6 to 4.5 mol/kg of ethylenically unsaturated double bonds of which not more than 10% are vinyl groups, or a mixture of such synthetic resins, and
B. a compound of the general formula $Ar-O-R_1-O-CO-CR_2=CH_2$, wherein Ar is an optionally substituted aryl radical, $R_1$ is an alkylene radical having 1 to 6 carbon atoms, and $R_2$ is a hydrogen atom or an alkyl radical having 1 to 3 carbon atoms, or a mixture of such compounds, and wherein A comprises from 10 to 70% by weight and B comprises from 30 to 90% by weight of the total quantity of A and B; and curing the coated substrate by the application of radiation to produce a coated substrate having a having a gloss of between 3 and 50 units according to DIN 67 530.

2. A process according to claim 1, wherein component A comprises a polyester resin or a mixture of polyester resins.

3. A process according to claim 1, wherein Ar is a phenyl radical.

4. A process according to claim 1, wherein $R_1$ is an alkylene radical having 1 to 3 carbon atoms.

5. A process according to claim 1, wherein $R_2$ is a hydrogen atom or a methyl radical.

6. A process according to claim 1, wherein component B comprises phenoxyethyl acrylate.

* * * * *